Feb. 28, 1933. K. E. LYMAN 1,899,515
FREE WHEELING TRANSMISSION MECHANISM
Filed Nov. 26, 1930
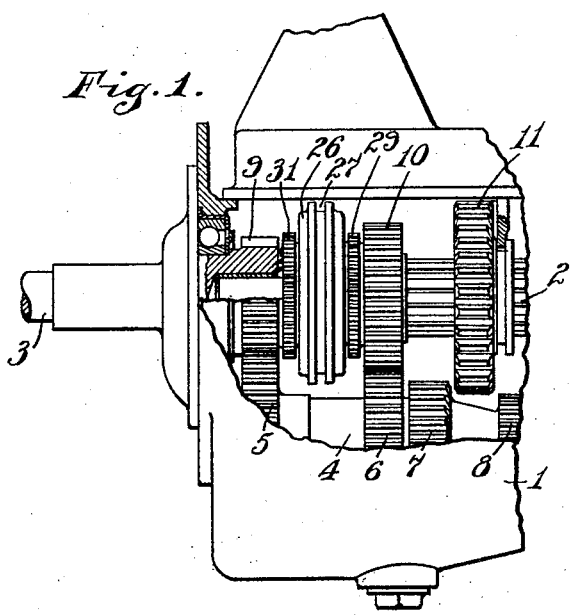
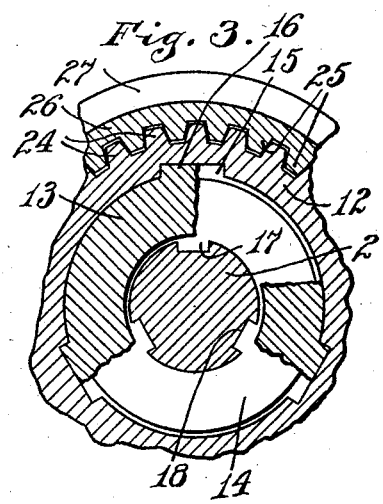
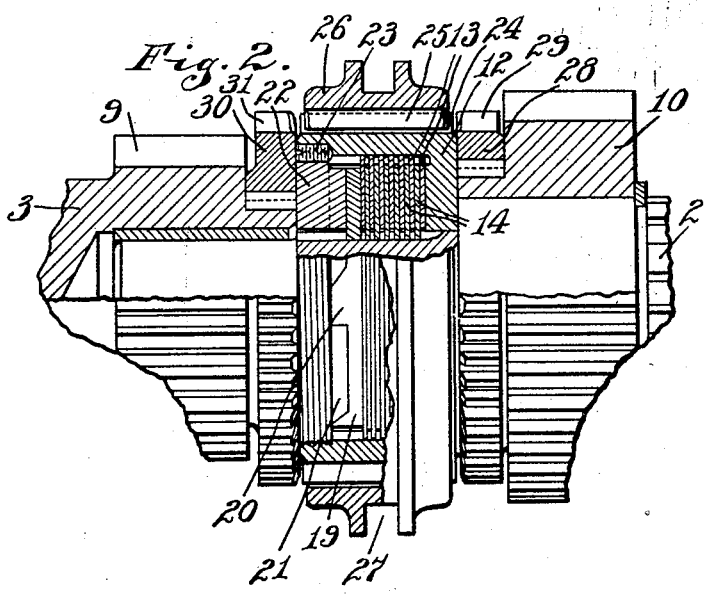
INVENTOR.
Kenneth E. Lyman,
BY
Hood + Hahn.
ATTORNEYS Patented Feb. 28, 1933

1,899,515

UNITED STATES PATENT OFFICE

KENNETH E. LYMAN, OF ROCKFORD, ILLINOIS, ASSIGNOR, BY MESNE ASSIGNMENTS, TO FREE WHEELING PATENTS CORPORATION, OF SOUTH BEND, INDIANA, A CORPORATION OF DELAWARE

FREE WHEELING TRANSMISSION MECHANISM

Application filed November 26, 1930. Serial No. 498,315.

My invention relates to improvements in automobile transmissions and particularly to that type of transmissions wherein means are provided for permitting the driven shaft of the automobile to operate independently of the driving shaft when the momentum speed of the driven shaft is greater than that of the speed of the driving or engine shaft.

It is one of the objects of my invention to provide a simplified form of transmission having the above characteristics in which, when the driving shaft again, after having been disconnected from the driven shaft, picks up the driven shaft, there will be no appreciable jar or shock imparted to the driven shaft.

For the purpose of disclosing my invention I have illustrated one embodiment thereof in the accompanying drawing, in which:

Fig. 1 is a partial longitudinal sectional view of a transmission embodying my invention;

Fig. 2 is a detailed longitudinal sectional view showing more particularly the overrunning clutch, and Fig. 3 is a transverse sectional view showing the clutching mechanism.

In the embodiment of the invention illustrated the transmission housing 1 which may be of the usual construction has projected therein the driven shaft 2 and the drive shaft 3. The drive shaft as is usual in such construction is connected through the usual clutch mechanism with the engine, and the driven shaft 2 is connected with the differential and wheels of the automobile.

In addition to the above shafts I provide a jack-shaft having mounted thereon a spool 4 which is provided with a series of gears 5, 6, 7 and 8. The gear 5 is in constant mesh with and is driven from a gear 9 mounted on the drive shaft 3. The gear 6 is in constant mesh with and drives a gear 10 normally rotatably mounted on the shaft 2. The gear 7 is adapted to be meshed with an axially movable gear 11 splined on the shaft 2. This gear 11 is also adapted to mesh with an idler gear (not shown) in turn meshing with the gear 8. By this arrangement when the gear 11 is meshed with the idler gear the shaft 2 is driven in a reverse direction. When the gear 11 is meshed with the gear 7 the shaft 2 is driven at low speed. When the gear 10 is connected with the shaft 2 the shaft 2 is driven at second speed. Means to be more fully described hereinafter are also provided for directly connecting the shafts 3 and 2 for the purpose of direct or high speed drive.

Rotatably mounted on the shaft 2 is a ring member 12 which is recessed to receive the friction discs 13 and 14 adapted to surround the shaft 2. The inner surface of this recessed portion is provided with axial channels 15, adapted to receive projections 16, on the discs 13 so that, the discs, while being axially movable relatively to the member 12 are rotatably connected thereto. The discs 14, which are interdigitated with the discs 13, are provided with projections 17 extending into longitudinal channels 18 on the shaft 2 so that these discs, while axially movable relatively to the shaft, are rotatably connected thereto. A pressure ring 19 abuts the series of discs 13 and 14 and this pressure ring is also provided with projections fitting into the channels 18 whereby the ring is rotatably connected with the shaft 2. This ring is provided on its face with a series of cammed surfaces 20 adapted to cooperate with a corresponding series of cammed surfaces 21 on a second pressure ring 22. This ring fits within the clutch member 12 and is locked thereto by a series of screws 23 entering cooperating openings in the rim of the ring 12 and in the periphery of the pressure member 22. This structure comprises an overrunning clutch of the friction type and the arrangement is such that when the ring 12 rotates relatively to the shaft 2 in a clockwise direction, looking at Fig. 3, the cammed surfaces 21 operating on the cammed surfaces 20 will tend to separate the pressure members thereby forcing the friction discs 13 and 14 into frictional engagement and locking the parts together. If, however, the shaft 2 rotates relatively to the ring 12 in a clockwise direction the pressure members will tend to move toward one another thereby releasing the clutch members.

The outer periphery of the ring 12 is provided with radially disposed dental clutch teeth 24 with which engage clutch teeth 25 mounted on the axially movable clutch ring 26. This ring is provided with an annular groove 27 to be engaged by the shifter fork of the transmission shifter mechanism.

A hub of the gear 10 is provided with a ring 28 having radially disposed clutch teeth 29 and provided with internal teeth meshing with teeth on the hub of the gear 10 to prevent relative rotation between this ring 28 and the gear.

A similar ring 30 is mounted on the end of the shaft 3 which gear is provided with teeth 31.

In operation, the low and reverse drive is accomplished by the shifting of the gear 11 in the manner usual with the ordinary commercial type of automobile transmission. When it is desired to drive at second speed the axially shiftable clutch member 26 is shifted to engage the teeth 25 with the teeth 29, thereby connecting the ring, or outer clutch member 12, with the gear 10 thus driving the ring 12. As long as the ring 12 is the driving member, as between this ring and the shaft 2, the pressure rings will tend to separate compressing the friction discs 13 and 14 and connecting the ring 12 to the shaft 2, thus driving the shaft 2 from the gear 10. If, however, the shaft 2 becomes the driving member, due to the fact that the momentum of the automobile causes the driven shaft 2 to rotate faster than the driving gear 10, the compression rings will tend to move together thereby decreasing the pressure on the friction rings 13 and 14 permitting the shaft to rotate independently of the shaft 3. The clutch mechanism therefore provides an overrunning clutch connection. If instead of driving at second speed it is desired to drive at high speed, that is directly connecting the shafts 2 and 3, the axially shiftable member 26 is shifted to the left engaging the teeth 25 with the teeth 31 thus connecting the clutch member 12 with the shaft 3. The operation of the clutch under these circumstances is the same.

I claim as my invention:

1. In an automobile transmission the combination with a driving member and a driven member, of a friction clutch including a ring member normally disconnected from said driving and driven members, interdigitated friction discs connected to the driven member and to said ring member, a pressure member connected to the driven member and a second pressure member connected to the ring member for causing a frictional engagement between said discs on a relative rotation between the ring member and the driven member in one direction and axially movable means on the ring member for connecting said ring member with the driving member.

2. In a transmission the combination with a driving member and a driven member, of an overrunning clutch for connecting said members including a ring member normally disconnected from said driving and driven members, interdigitated friction discs connected to the ring member and to the driven member, a pressure member connected to the driven member having cammed surfaces, a pressure member connected to the ring member having cammed surfaces cooperating with the cammed surfaces of the opposite pressure member for causing a frictional engagement between the discs upon the relative rotation of the driven member and ring member in one direction, positive clutch means on the driving member and axially movable positive clutch means on the ring member for engagement with the clutch means on the driving member to connect the ring member and the driving member.

3. A clutch structure for use in a transmission including a driving shaft, a driven shaft and a gear rotatably mounted on the driven shaft, said structure comprising an overrunning clutch on the driven shaft including a ring member, interdigitated friction discs connected to the ring member and to the driven shaft, a pressure member connected to the driven shaft, a second pressure member connected to the ring member cooperating upon the relative rotative movement of the ring member and shaft in one direction to cause a frictional engagement between said discs, and an axially movable member rotatably connected with the ring member and shiftable independently of the clutch and gear in two directions to selectively connect the ring member of said clutch to the gear or to the driving shaft.

4. A clutch structure for use in a transmission including a driving shaft, a driven shaft and a gear rotatably mounted on the driven shaft, said gear and driving shaft each having clutch teeth drivingly associated therewith, said structure comprising an overrunning clutch on the driven shaft including a ring member, interdigitated friction discs connected to the ring member and to the driven shaft, a pressure member connected to the driven shaft and a second pressure member connected to the ring member cooperating upon the relative rotative movement of the ring member and driven shaft in one direction to cause frictional engagement between said discs, said ring member having non-rotatably mounted thereon an axially slidable member provided with teeth adapted for selective engagement with either the teeth on the driving shaft or the teeth on the gear for drivingly connecting the ring member either with the driving shaft or with the gear.

In witness whereof, I, KENNETH E. LYMAN, have hereunto set my hand at Rockford, Illinois, this 6th day of October, A. D. one thousand nine hundred and thirty.

KENNETH E. LYMAN.